United States Patent
Kiuchi et al.

(10) Patent No.: US 7,245,308 B2
(45) Date of Patent: Jul. 17, 2007

(54) DISPLAY CONTROL DEVICE AND DISPLAY DEVICE

(75) Inventors: Shinya Kiuchi, Iizuka (JP); Jun Ikeda, Fukuoka (JP); Shuichi Ojima, Fukuoka (JP); Tsuyoshi Hirashima, Kasuya-Gun (JP); Ryouta Hata, Iizuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 400 days.

(21) Appl. No.: 10/808,416

(22) Filed: Mar. 25, 2004

(65) Prior Publication Data

US 2004/0212739 A1 Oct. 28, 2004

(30) Foreign Application Priority Data

Apr. 9, 2003 (JP) ............................. 2003-105551

(51) Int. Cl.
*G09G 5/00* (2006.01)

(52) U.S. Cl. .................. 345/643; 345/589; 345/600; 345/603; 345/604; 345/639; 345/640; 382/167; 382/260; 382/274

(58) Field of Classification Search ............... 345/603, 345/604, 639, 640, 643
See application file for complete search history.

(56) References Cited

U.S. PATENT DOCUMENTS 6,677,959 B1 * 1/2004 James ..................... 345/660
7,075,554 B2 * 7/2006 Kagawa et al. ............. 345/600

OTHER PUBLICATIONS

Takashi Watanabe et al., "Gamma Transformation by Sigmoid Function in Digital Camera System", Japan Hardcopy 2000, pp. 277-280.

* cited by examiner

*Primary Examiner*—Kee M. Tung
*Assistant Examiner*—Antonio Caschera
(74) *Attorney, Agent, or Firm*—Wenderoth, Lind & Ponack, L.L.P.

(57) ABSTRACT

A display control device is provided which includes characteristic value-calculating unit for calculating a characteristic value based on an input image signal, a conversion characteristic-calculating unit for determining a conversion characteristic from the characteristic value, and a signal-converting unit for converting the input image signals in accordance with the determined conversion characteristic. The conversion characteristic has a low level region segment, which is close to the origin of axes respectively representing the input image signal and an output image signal of the display control device, a high level region segment, which is close to a full scale point, and a middle level region segment, which is positioned between the low level region and high level region, and the slope in the middle level region is set so as to be larger than both of the slopes of the low level region and the high level region.

15 Claims, 12 Drawing Sheets

DISPLAY CONTROL DEVICE AND DISPLAY DEVICE

BACKGROUND OF THE INVENTION

1. Field of the Invention

The present invention concerns an image display control device operable to provide improved feeling contrast for input image signals, and a display device utilizing the image display control device.

2. Description of the Related Art

With the development of the information society, occasions in which users view images that are displayed on display devices are increasing. However, the display capabilities of recent display devices have not necessarily reached an adequate level, and therefore, measures are necessary for improving the apparent view-amenity better than the cases where input image signals are input as they are into a display device.

In regard to this, a reference 1 ("Gradation Conversion by a Sigmoid Function in a Digital Camera System," Watanabe et al., Japan Hardcopy 2000 Collected Papers B-27, The Imaging Society of Japan) proposes a method of using a sigmoid function to make black (low level) blacker, make white (high level) whiter, and to expand feeling contrast to the middle level, thereby giving vividness and solidity to the image.

The sigmoid function is a nonlinear function, such as the following:

$$y = \{a^\wedge(1-r)\} * \{x^\wedge r\} \quad (0<=x<=a)$$

$$y = 1 - \{(1-a)^\wedge(1-r)\} * \{(1-x)^\wedge r\} \quad (a<x<=1)$$

Here, the parameter "a" is the mode of the luminance histogram of input image signals and the parameter "r" is a constant.

However, the prior art described in the reference 1 has the following problems.

(Problem 1) Since the sigmoid function is nonlinear, it cannot be realized by a simple operational circuit. It is therefore not practical in realizing the function by hardware.

(Problem 2) In the reference 1, the mode of a histogram is used as a parameter of the sigmoid function. However, in a case where pictures change in a continuous manner, this parameter tends to change greatly for every frame of picture and a flicker occurs in the displayed image after conversion.

Also, in general, the Y signal of Yuv color space is used as brightness. This Y signal may thus be used in a contrast improving process.

However, the Y signal capacity of the Yuv color space is greater than the brightness component capacity of RGB color space. Therefore, when a process of increasing the Y signal is performed without special consideration and then an inverse mapping from the Yuv color space to the RGB color space is performed, a result that exceeds the brightness component capacity of the RGB color space, that is, a result that cannot be displayed, actually may be obtained. Consequently, color clipping may occur.

For example, when a signal of R=0%, G=0%, and B=80% in the RGB color space is mapped to the Yuv color space, the brightness is determined as luminance Y=24%. Further, if a process of doubling the brightness (which is allowed in the Yuv color space) is performed, the result is that luminance Y=48% is obtained.

However, when the color after the process in the Yuv color space is inversely mapped to the RGB color space, the result of B>100%, which cannot be displayed, is obtained, thus causing color clipping.

OBJECTS AND SUMMARY OF THE INVENTION

Thus, an object of the present invention is to provide an image display control device which can be realized readily in terms of hardware, which can suppress flickering in image displays, and which can suppress color clipping.

A first aspect of the present invention provides a display control device for outputting an output image signal. The display control device according to the first aspect comprises: a characteristic value-calculating unit operable to calculate a characteristic value based on an input image signal, and a conversion characteristic-calculating unit operable to determine at least one conversion characteristic adaptively with respect to the input image signal based on the characteristic value.

With this structure, a process that reflects the property of the input image signals can be performed by use of the characteristic value.

A second aspect of the present invention provides a display control device for outputting an output image signal. The display control device according to the second aspect comprises: a conversion characteristic-calculating unit operable to determine a conversion characteristic adaptively with respect to an input image signal; a signal-converting unit operable to convert the input image signal in accordance with the conversion characteristic determined by the conversion characteristic-calculating unit; a weight-calculating unit operable to apply a mask to the input image signal in accordance with a weighting characteristic to generate a masked image signal; and a characteristic value-calculating unit operable to calculate a characteristic value based on the masked image signal generated by the weight-calculating unit. The conversion characteristic-calculating unit determines the conversion characteristic based on the characteristic value.

With this structure, by masking the input image signal using the weighting characteristic, an unnecessary variation of the characteristic value can be suppressed to reduce the occurrence of flickering.

A third aspect of the present invention provides a display control device for outputting an output image signal. The display control device according to the third aspect comprises: a color-converting unit operable to map an input image signal in an RGB color space to a image signal in another color space such that the image signal in the other space possesses a brightness component and other components; a conversion characteristic-calculating unit operable to determine a conversion characteristic adaptively with respect to the brightness component; a signal-converting unit operable to convert the brightness component in accordance with the conversion characteristic determined by the conversion characteristic-calculating unit; and an inverse color-converting unit operable to map an image signal in the other color space, the image signal being composed of the brightness component converted by the signal-converting unit and the other components, to an image signal in the RGB color space as the output image signal.

With this structure, a brightness component and a chroma component can be easily obtained by a simple processing, and therefore, contrast adjustment can be carried out without causing clipping.

A fourth aspect of the present invention provides a display control device as defined in the second aspect, wherein the weighting characteristic suppresses a low level region in the input image signal and a high level region in the input image signal.

This structure is suitable for the processing of images with a large amount of middle level gradations, such as a natural image.

A fifth aspect of the present invention provides a display control device as defined in the second aspect, wherein the weighting characteristic suppresses a middle level region in the input image signal and a high level region in the input image signal.

This structure is suitable for the processing of images with a large amount of low level gradations, such as an image that is dark as a whole.

A sixth aspect of the present invention provides a display control device as defined in the third aspect, wherein the other color space possesses the same capacity as the RGB color space with respect to the brightness component, the other color space being an HSV color space, for example.

With this structure, the color clipping that may accompany the conversion of the brightness component can be prevented.

A seventh aspect of the present invention provides a display control device as defined in the third aspect, wherein the conversion characteristic is determined such that, assuming that an abscissa axis shows the input image signal and an ordinate axis shows the output image signal, and a range from an origin to full scale point along the abscissa axis is divided into a low level region, which is close to the origin, a high level region, which is close to the full scale point, and a middle level region, which is positioned between the low level region and the high level region, an average slope of the output image signal in the middle level region is greater than any one of average slopes of the output image signal in the low and high level regions.

With this structure, the contrast of the middle level region can be enhanced in accordance with an input image signal, the low level region (black) can be made blacker, and the high level region (white) can be made whiter to thereby improve the vividness of the displayed image.

A eighth aspect of the present invention provides a display control device as defined in the first aspect, wherein the conversion characteristic is determined such that, assuming that an abscissa axis shows the input image signal and an ordinate axis shows the output image signal, and a range from an origin to a full scale point along the abscissa axis is divided into a low level region, which is close to the origin, a high level region, which is close to the full scale point, and a middle level region, which is positioned between the low level region and the high level region, an average slope of the output image signal in the middle level region is greater than any one of average slopes of the output image signal in the low and high level regions.

With this structure, a display device possessing the same features as in the previous aspect can be provided.

A ninth aspect of the present invention provides a display control device as defined in the eighth aspect, wherein the characteristic value determines a size and location of the middle level region.

With this structure, the middle level region, which is to be enhanced in contrast, can be varied dynamically in accordance with the input image signal property that is expressed by the characteristic value.

A tenth aspect of the present invention provides a display control device as defined in the eighth aspect, wherein the characteristic value is an average brightness of an image being expressed by the input image signal.

With this structure, since a characteristic value "t" that is more stable than the mode of a histogram is used, the flickering of the image display can be suppressed.

A eleventh aspect of the present invention provides a display control device as defined in the eighth aspect, wherein the characteristic value-calculating unit outputs a signal that adjusts an output level of the signal-converting unit and a light emission level of an external light source in a correlated manner.

With this structure, in a display unit with a light source, the display level of a display panel and the light emission level of the light source can be enhanced.

A twelfth aspect of the present invention provides a display control device as defined in the eleventh aspect, wherein, when a maximum ordinate value of the conversion characteristic falls below a threshold value, the characteristic value-calculating unit performs adjustment so as to raise the output level of the signal-converting unit and to lower the light emission level of the external light source.

With this structure, the power consumption can be reduced by lowering the light emission level of the external light source while obtaining the same apparent display result at the display unit.

A thirteenth aspect of the present invention provides a display control device as defined in the eleventh aspect, wherein, when a maximum ordinate value of the conversion characteristic exceeds a threshold value, the characteristic value-calculating unit performs adjustment so as to raise the light emission level of the external light source.

With this structure, a more vivid display result can be obtained at the display unit by raising the light emission level in accordance with a high display level.

A fourteenth aspect of the present invention provides a display control device as defined in the seventh aspect, wherein the conversion characteristic is composed of a plurality of segments possessing respectively fixed slopes.

With this structure, since a linear process is performed using segments, the process can be simplified and readily incorporated in the hardware.

A fifteenth aspect of the present invention provides a display control device as defined in the seventh aspect, wherein the low level region, the middle level region, and the high level region possess a respective single segment.

With this structure, the conversion characteristic can be handled in a simple manner by a total of three segments.

A sixteenth aspect of the present invention provides a display control device for outputting an output image signal. The display control device according to the sixteenth aspect comprises: a color-converting unit operable to map an input image signal in an RGB color space to a image signal in another color space such that the image signal in the other space possesses a brightness component, a chroma component, and one or more other components; a brightness-converting unit operable to convert the brightness component in accordance with a fixed brightness conversion characteristic; a chroma-converting unit operable to convert the chroma component in accordance with a fixed chroma conversion characteristic; and an inverse color-converting unit operable to map a image signal in the other color space, the image signal being composed of the brightness component converted by the brightness-converting unit, the chroma component converted by the chroma-converting unit, and the one or more other components, to a image signal in the RGB color space as an output image signal, wherein the chroma conversion characteristic is composed of a plurality of segments possessing respectively fixed slopes.

With this structure, by using fixed conversion characteristics regardless of the input image signal, the circuit scale can be reduced significantly in realizing the hardware. Furthermore, by processing the chroma component as well, not only the contrast but the vividness can also be enhanced to improve the apparent image quality. Also, the brightness component and the chroma component can be processed independently and the image quality can thus be adjusted freely.

A seventeenth aspect of the present invention provides a display control device as defined in the sixteenth aspect, wherein the plurality of segments of the chroma conversion characteristic are composed of broken lines that are connected in an upward convex manner.

With this structure, since a linear process is performed by using the segments, the process can be simplified and readily incorporated in hardware.

An eighteenth aspect of the present invention provides a display control device as defined in the sixteenth aspect, wherein the brightness component V=(a maximum value of the RGB values), and the chroma component S=((the maximum value of the RGB values)−(a minimum value of the RGB values))/(the maximum value of the RGB values).

With this structure, the brightness component and the chroma component can be determined by simple calculations and the circuit scale can be made small in realizing the hardware.

The above and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Embodiments of the present invention shall now be described with reference to the drawings.

FIRST EMBODIMENT

Figure 1:
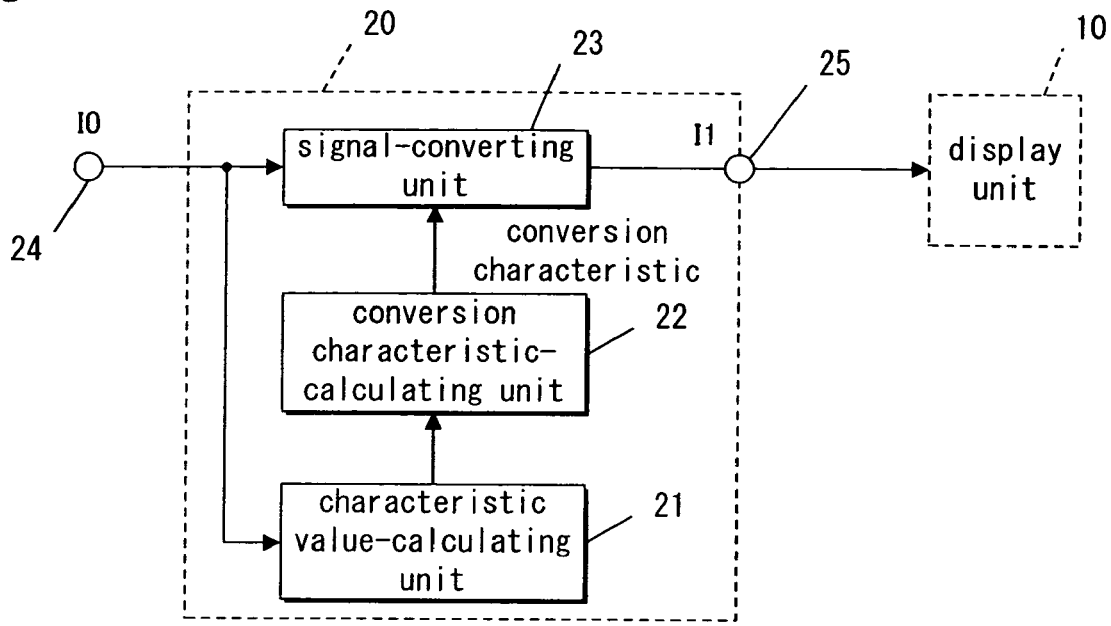
FIG. 1 is a block diagram of a display device according to a first embodiment of the present invention.
Figure 2:
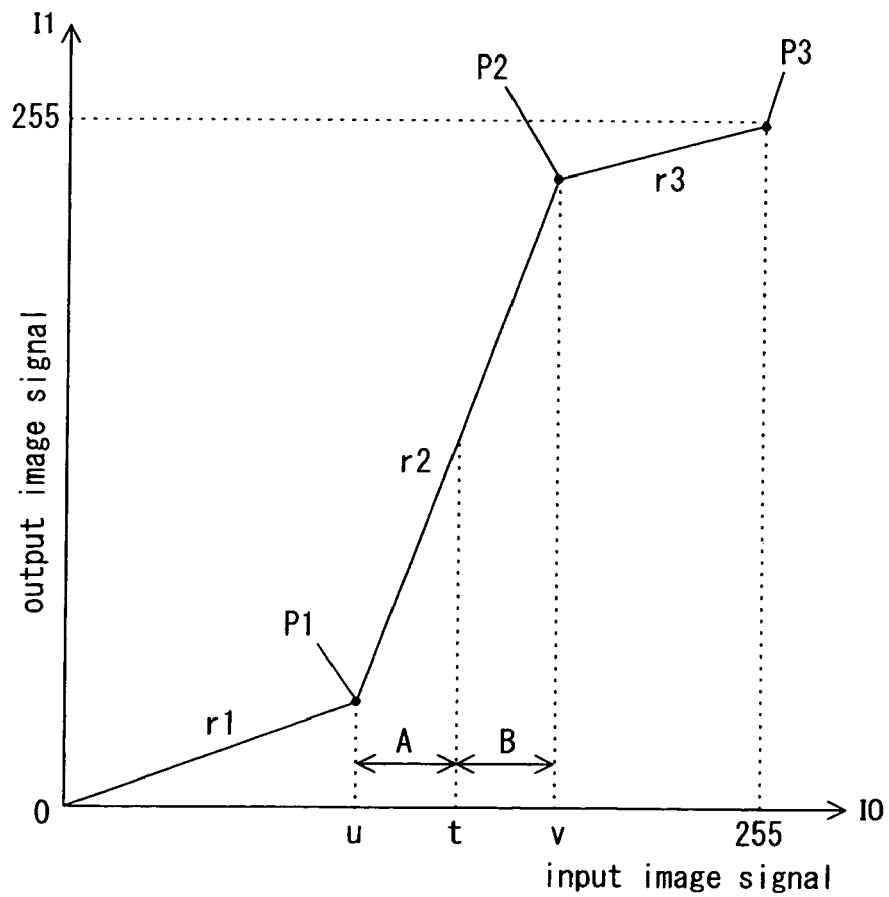
FIG. 2 is an exemplary diagram of a conversion characteristic of the first embodiment of the present invention.
Figure 3:
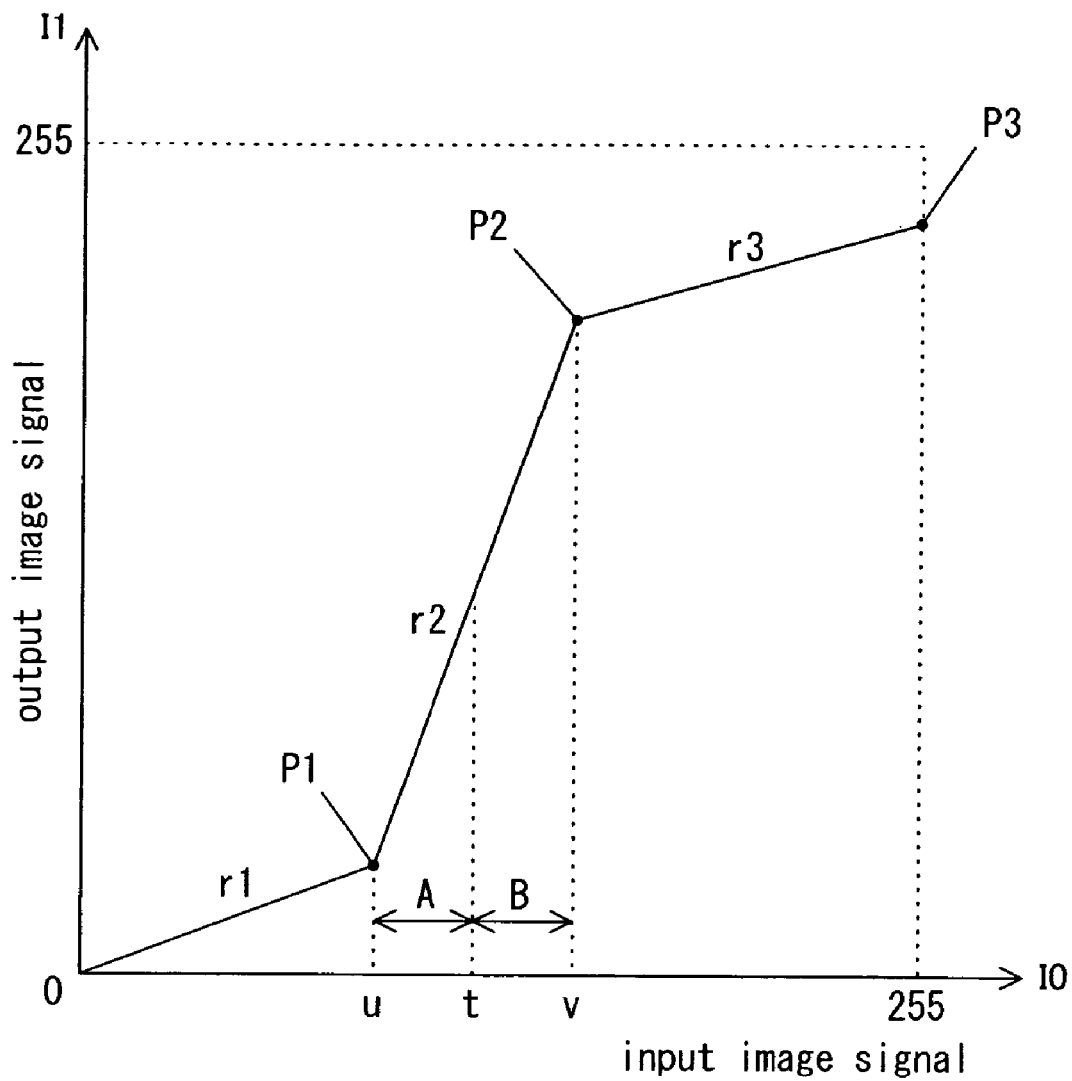
FIG. 3 is an exemplary diagram of a conversion characteristic of the first embodiment of the present invention.

FIG. 1 through FIG. 3 concern a first embodiment. FIG. 1 is a block diagram of a display device according to the first embodiment of the present invention.

In FIG. 1, a display unit 10 is an LCD, CRT, etc., and any display unit may be used as long as it can perform display with the brightness component being provided with gradation.

A display control device 20 comprises an input terminal 24 and an output terminal 25, and controls the display state of the display unit 10 by means of an output image signal I1 from the output terminal 25.

The display control device 20 comprises a characteristic value-calculating unit 21 that calculates a characteristic value for a frame of an image based on an input image signal I0 input from the input terminal 24. With the present embodiment, the input image signal I0 is of video signal components, which are brightness components in the present embodiment. Other arbitrary brightness components may be used as the brightness components.

As the characteristic value, an average value "t" for a frame of an image of the input image signal I0 is used. The average value "t" is not only easy to calculate but also high in the frequency of occurrence in an image as a whole, and is high in stability and low in variation among images in comparison to the mode of a histogram, etc.

That is, the characteristic value-calculating unit 21 obtains an input image signal I0 for a frame of an image, determines the average value "t" of the luminance, and outputs this average value "t" as the characteristic value "t" to a conversion characteristic-calculating unit 22 comprised in the display control device 20.

The conversion characteristic-calculating unit 22 inputs the characteristic value "t" outputted from the characteristic value-calculating unit 21, and determines a conversion characteristic as shown in FIG. 2. That is, the characteristic value and the conversion characteristic are renewed for each frame as a rule.

As shown in FIG. 2, this conversion characteristic is such that when an abscissa axis shows an input image signal I0 and ordinate axis shows an output image signal I1, and the region from the origin (0, 0) to a full scale point (255 in the present embodiment, since an 8-bit display is to be performed) is divided into a low level region (0<=I0<u, slope: r1), which is close to the origin, a high level region (v<I0<=255, slope: r3), which is close to the full scale point, and a middle level region (u<I0<=v, slope: r2), which is positioned between the above regions, the following relations hold: r2>r1 and r2>r3. These slopes r1, r2, and r3 are fixed values.

That is, a single segment exists in each of the low, middle, and high level regions. By this structure, an output image signal can be determined by simple computations that are all linear as shall be described later, and the realization of the hardware is facilitated.

Also, the characteristic value "t" determines the size and location of the middle level region of the conversion characteristic. That is, with the present embodiment, upon inputting the characteristic value "t", the conversion characteristic-calculating unit 22 sets (width A)=(width B)=t/4, u=t−A, and v=t+B. The size and location of the middle level region is thus determined.

Next, the conversion characteristic-calculating unit 22 draws a straight line of a slope r1 from the origin (0, 0), and determines an intersection P1 with a straight line of I0=u. The conversion characteristic-calculating unit 22 also draws a straight line of a slope r2 from the intersection P1, and determines an intersection P2 with a straight line of I0=v. Furthermore, the conversion characteristic-calculating unit 22 draws a straight line of a slope r3 from the intersection P2, and determines an intersection P3 with a straight line of I0=255. The segments OP1, P1P2, and P2P3 are thus finalized and the conversion characteristic is determined.

Since this conversion characteristic is dependent on a characteristic value "t", when the characteristic value "t" varies, the conversion characteristic varies from the state of FIG. 2. For example, when the characteristic value "t" decreases from the state of FIG. 2, the middle level region becomes narrow and shifts towards the origin as shown in FIG. 3.

Oppositely, when the characteristic value "t" increases, the middle level region is widened and shifts towards the full scale side.

Due to such variation of the conversion characteristic, adaptive display control is performed on an input image signal I0.

In FIG. 1, a signal-converting unit 23 comprised in the display control device inputs an input image signal I0 from the input terminal 24, and inputs the conversion characteristic parameters that have been determined as described above from the conversion characteristic-calculating unit 22. The signal-converting unit 23 then converts the input image signal I0 in accordance with the conversion characteristic and outputs an output image signal I1 to the display unit 10 via the output terminal 25.

As a result of the above processes, the contrast of the middle level region around the average brightness is enhanced and vividness of the image is improved. Also, since black becomes blacker and white becomes whiter, a visually-feeling contrast of the image is improved. Furthermore, only linear processes are performed with the conversion characteristic, and the realization of the hardware is facilitated.

Although three segments were used in the conversion characteristic described above, a larger number of segments may be used as long as there is no deviation from the gist of the present invention. Also, the junction of one segment with another segment may be rounded.

Furthermore, in the present embodiment, the characteristic value "t" and/or the conversion characteristic are calculated based on an input image signal I0 of an image to be displayed currently. However, the characteristic value "t" and/or the conversion characteristic may be calculated based on input image signals of the prior images already displayed. By doing so, in a case where the displayed images vary continuously, the variation of the conversion characteristic can be smoothened to obtain more stable image quality.

SECOND EMBODIMENT

Figure 4:
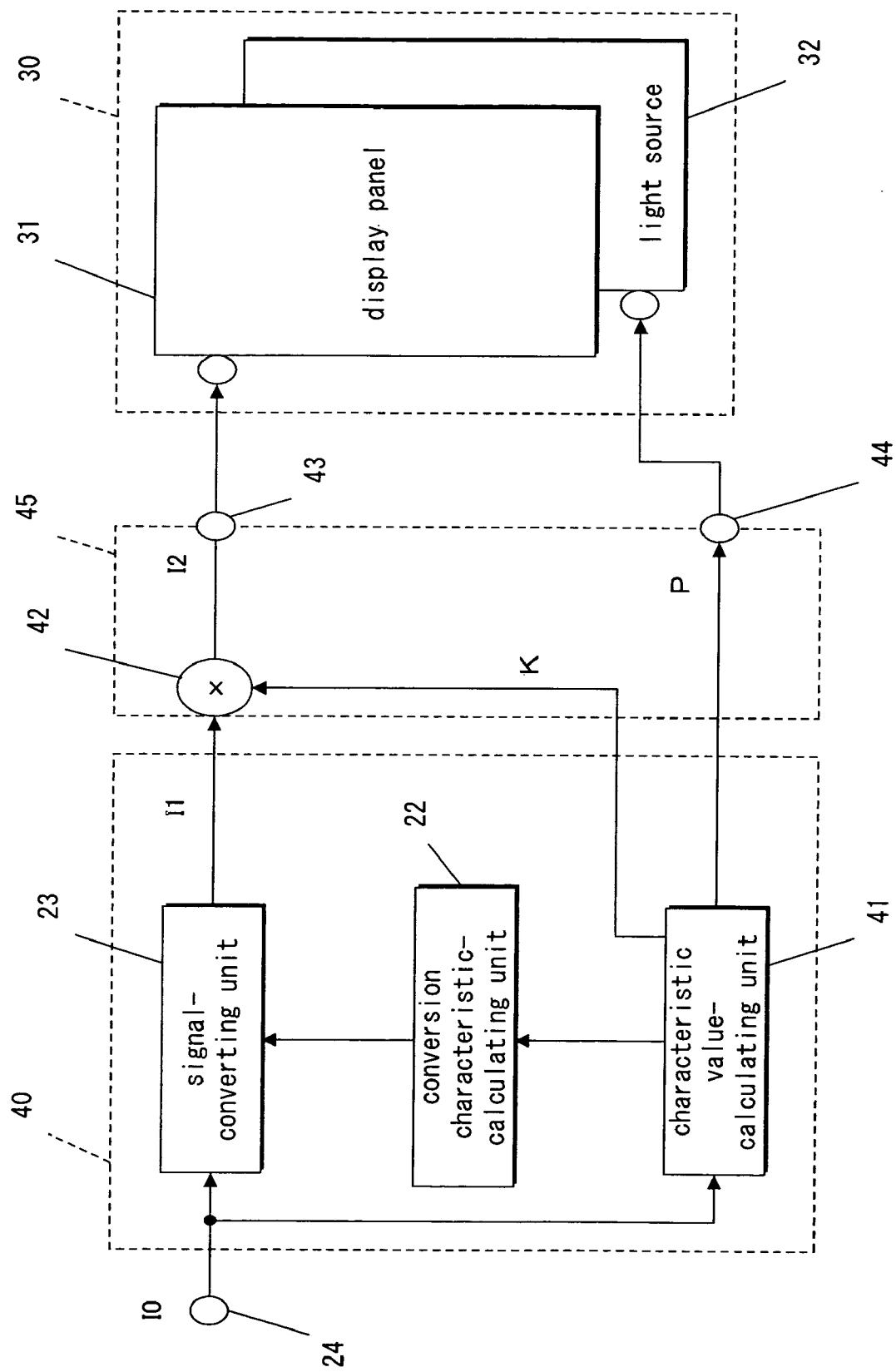
FIG. 4 is a block diagram of a display device according to a second embodiment of the present invention.
Figure 5:
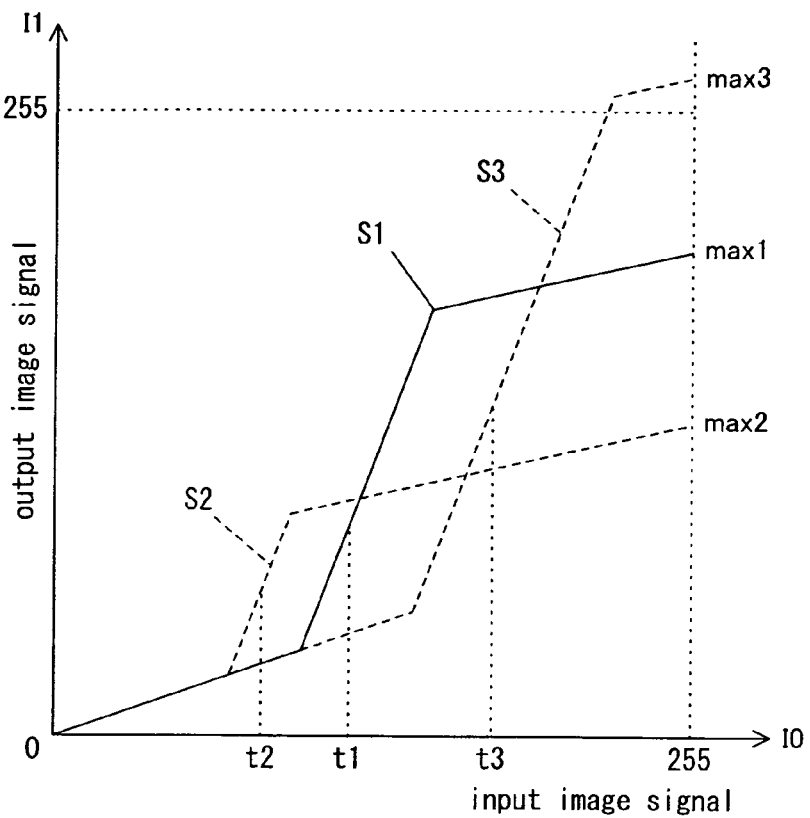
FIG. 5 is an explanatory diagram of a threshold value of the second embodiment of the present invention.

FIG. 4 and FIG. 5 concern a second embodiment. FIG. 4 is a block diagram of a display device according to the second embodiment of the present invention. The present embodiment is favorable for a case where a display unit 30 has a light source 32 and a display panel 31, which is illuminated by the light source 32 (typically, when the display unit 30 is a back-light type LCD).

A display control device 40 according to the second embodiment comprises a conversion characteristic-calculating unit 22 and a signal-converting unit 23 which are the same as those of the first embodiment. Also, a light source-adjusting device 45, which is placed at the subsequent stage of the display control device 40, has a first output terminal 43 connected to the display panel 31, and a second output terminal 44 connected to the light source 32.

With the present embodiment, in the light source-adjusting device 45, a multiplication unit 42 is placed between the signal-converting unit 23 and the first output terminal 43, and a factor K is outputted from a characteristic value-calculating unit 41 comprised in the display control device 40 to the multiplication unit 42. The multiplication unit 42 multiplies an output image signal I1 by a factor of K and outputs the result as an output image signal I2 to the display panel 31. The output image signal I2 determines a display level of the display panel 31.

Also, in the display control device 40, the characteristic value-calculating unit 41 outputs to the second output terminal 44 a light emission control signal P, which determines a light emission level of the light source 32.

By means of the factor K and the light emission control signal P, the characteristic value-calculating unit 41 adjusts the output level of the signal-converting unit 23 (i.e., the light emission level of the display panel 31) and the light emission level of the light source 32 in a correlated manner.

Specifically, as shown in FIG. 5, a maximum value max1 of the output image signal is set as a reference value. The maximum value max1 results from a conversion characteristic S1 that is determined by a suitable characteristic value "t1".

When a maximum value max2 for a conversion characteristic S2 resulting from a characteristic value "t2" is such that max1>max2, the characteristic value-calculating unit 41 determines a factor K=max1/max2 and outputs the factor K to the multiplication unit 42. Here, since K>1, the output image signal I2 becomes greater than the input image signal I1 and the light emission level of the display panel 31 increases. Also, the characteristic value-calculating unit 41 sets a light emission control signal to P=(max2/max1)^gamma (gamma is one of the gradation characteristics of the display panel 31). In accordance with a CRT, gamma is set in many cases to a value of approximately "2.2". With this scheme, an amplified video signal of the display panel 31 and a lowered brightness of the light source 32 are canceled out. Thereby, the power consumption of the light source 32 can be suppressed without deteriorating the image quality.

Meanwhile, when a maximum value max3 for a conversion characteristic S3 resulting from a characteristic value "t3" is such that max1<max3, the characteristic value-calculating unit 41 sets a factor K=max1/max3, and as a result, the output image signal I2 (=K*I1) becomes less than the input image signal I1. Also, the characteristic value-calculating unit 41 sets the light emission control signal to P=(max1/max3)^gamma. Consequently, the light emission level of the light source 32 increases. A bright high-quality image display can thus be performed. If the display unit 30 is an organic EL, its life can be extended in cases where the peak brightness drops. Also, even if the input image signal I1 exceeds the full scale (255 in the present embodiment), the output image signal I2 can be made small enough to fall within the full scale. Therefore, color clipping can be prevented.

In the above two cases, the light emission control signal P and the factor K are preferably renewed for each single frame. However, the light emission control signal P and the factor K may be calculated not from an input signal I0 of the currently displayed image, but based on the input image signals of the prior image. By doing so, in a case where the displayed images vary continuously, the variation of the conversion characteristic can be smoothened to obtain a more stable image quality.

First Modification Example

Figure 13:
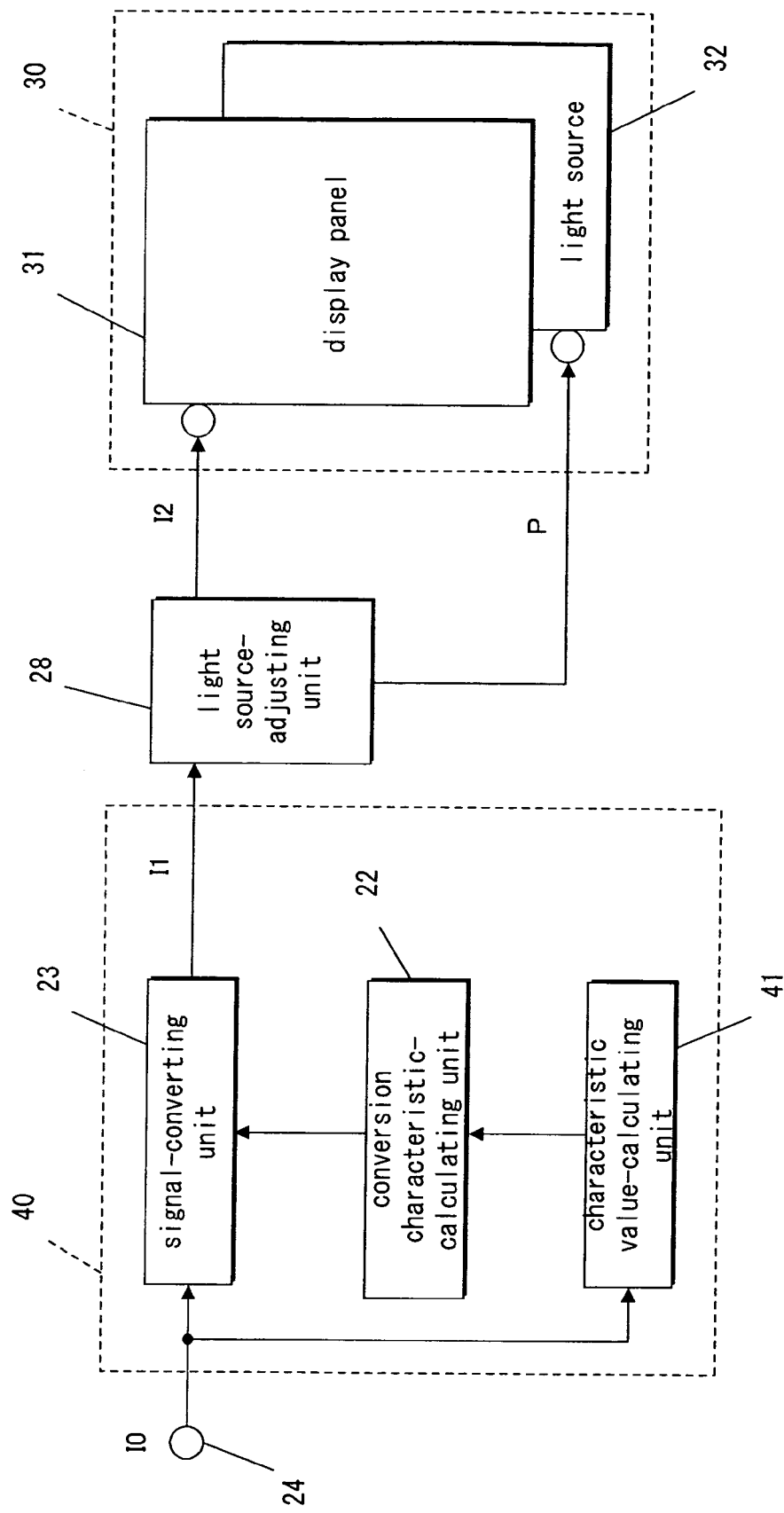
FIG. 13 is a block diagram of a display device according to a First Modification Example of the present invention.
Figure 14:
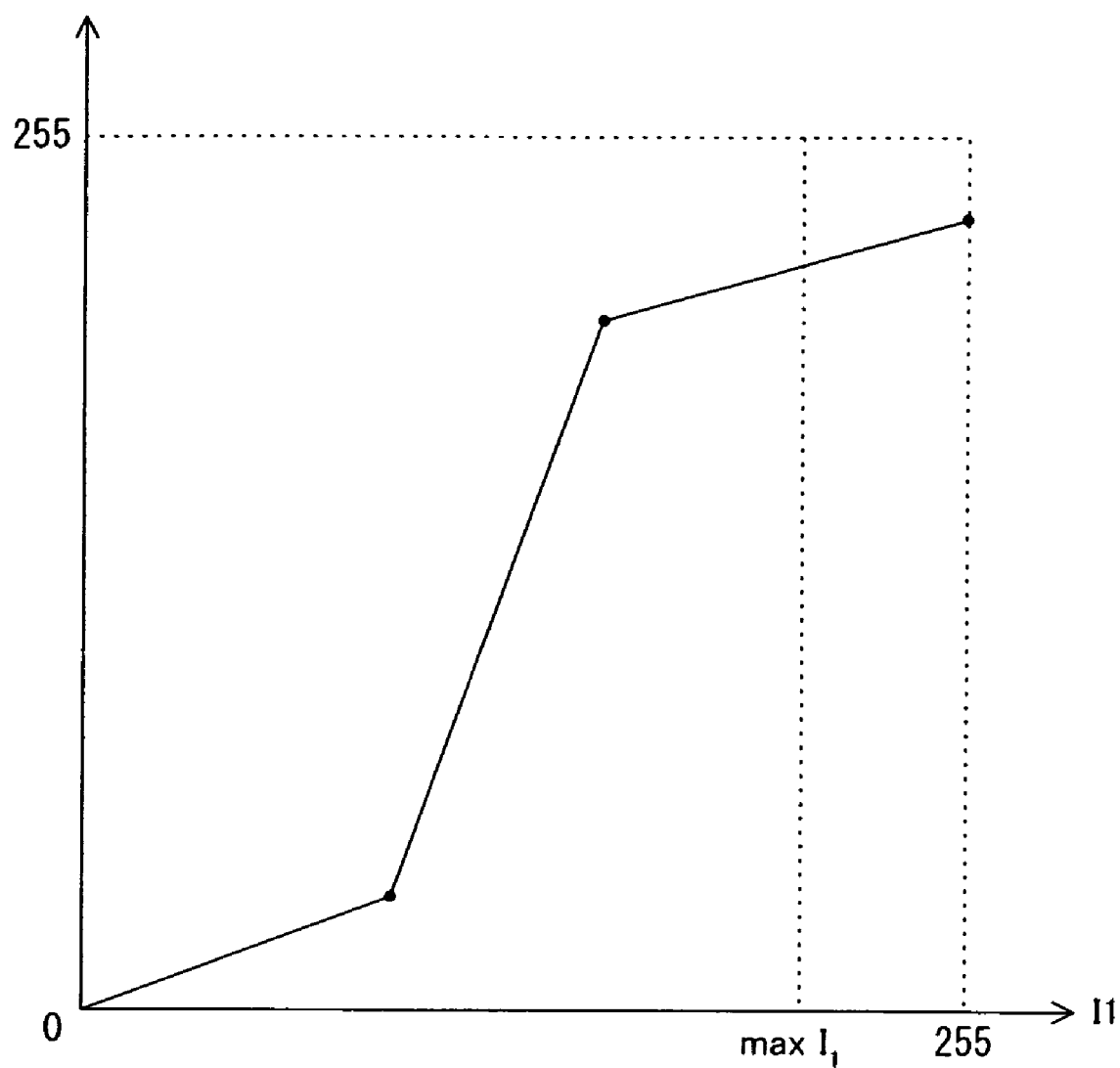
FIG. 14 is an exemplary diagram of a conversion characteristic for a light source adjustment of the First Modification Example of the present invention.

FIG. 13 and FIG. 14 concern a First Modification Example of the second embodiment. As shown in FIG. 13, with this First Modification Example, in place of the light source-adjusting device 45 of the second embodiment (see FIG. 4), a light source-adjusting unit 28 is placed between the display control device 40 and the display unit 30.

The light source-adjusting unit 28 adjusts, on the basis of an output image signal I1 of the signal-converting unit 23, an output image signal I2 to be outputted to the display panel 31 and a light emission control signal P to be outputted to the light source 32 in a correlated manner. Unlike the structure of FIG. 4, with the present example, the characteristic value-calculating unit 41 is not required to determine the factor K and the light emission control signal P.

The light source-adjusting unit 28 performs the following process. That is, the light source-adjusting unit 28 inputs the output image signal I1 for a single frame from the signal-converting unit 23 and determines a maximum luminance value maxI1, an example of which is shown in FIG. 14.

Here, since the full scale of this example is set to 255, the light source-adjusting unit 28 sets an output image signal I2=(255/maxI1)*I1, which is to be outputted to the display panel 31.

Furthermore, in order to cancel out variations of the output image signal I2 to the display panel 31, the light source-adjusting unit 28 sets the light emission control signal P so as to provide a brightness of (maxI1/255)^gamma (%), where gamma is as has been described above.

To reiterate, the above process is executed on each frame.

The brightness of the light source 32 is thereby lowered and the consumption power is suppressed. However, even though the brightness of the light source 32 decreases, the apparent quality of the image on the display panel 31, when viewed with the light source 32 being overlapped below the display panel 31, is maintained, due to the above-mentioned canceling out.

THIRD EMBODIMENT

Figure 6:
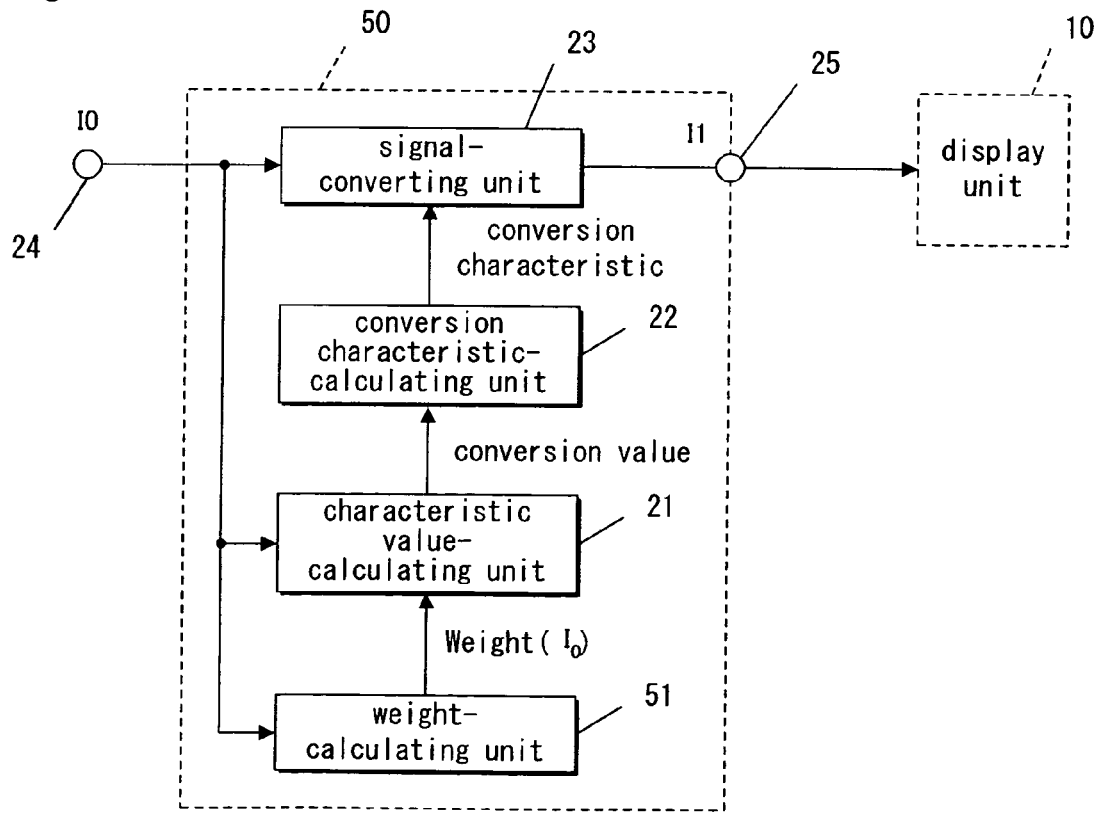
FIG. 6 is a block diagram of a display device according to a third embodiment of the present invention.
Figure 7:
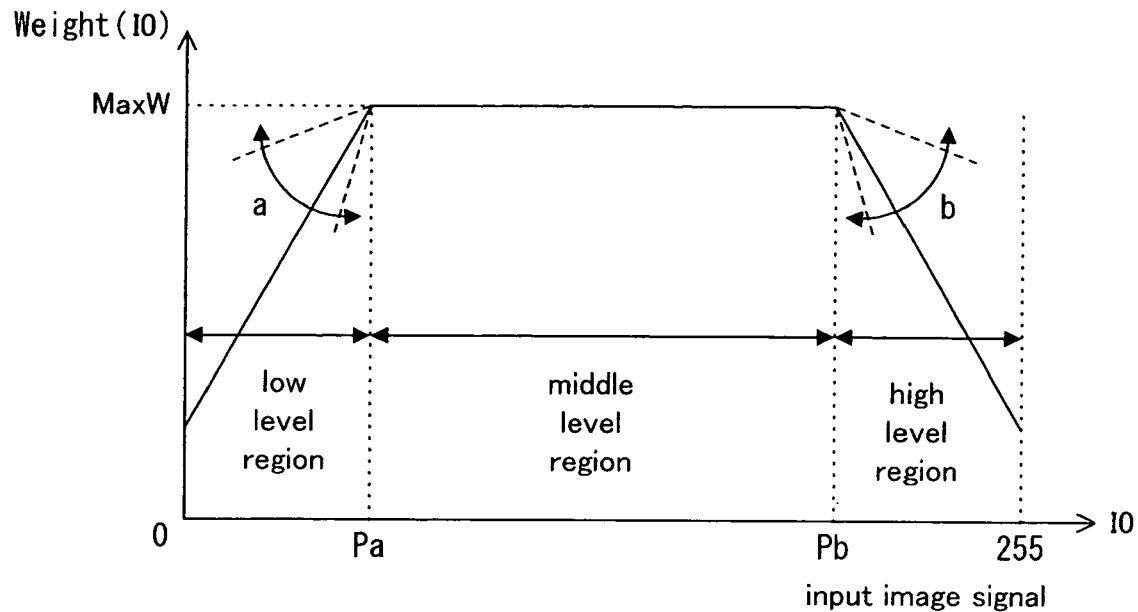
FIG. 7 is an exemplary diagram of a weighting characteristic (placing priority on a middle level) of the third embodiment of the present invention.
Figure 8:
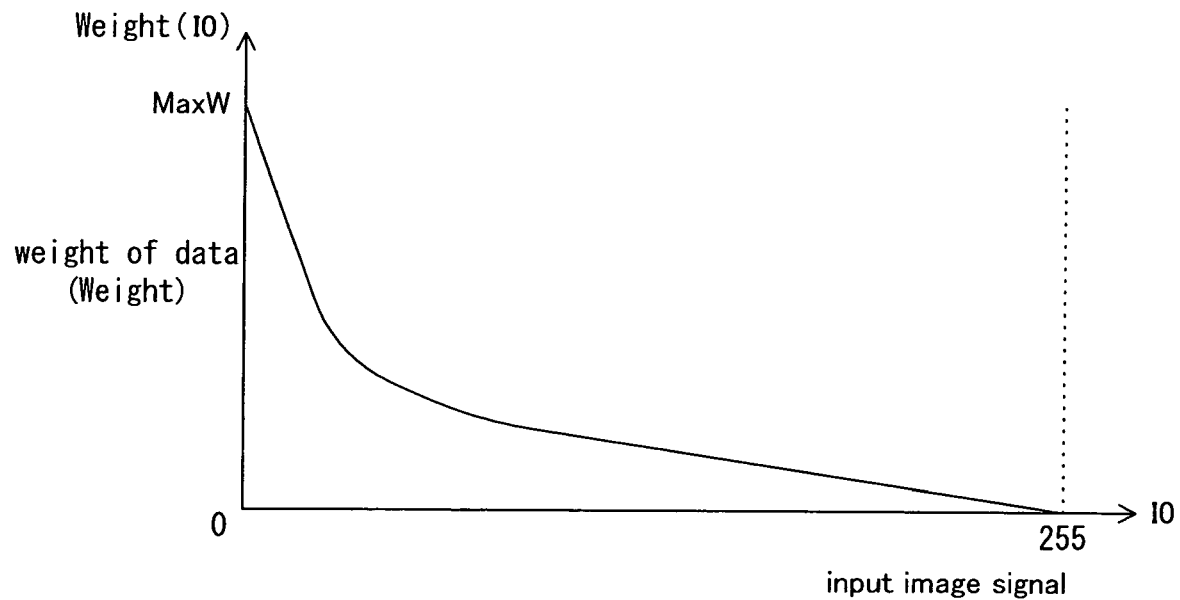
FIG. 8 is an exemplary diagram of a weighting characteristic (placing priority on a low level) of the third embodiment of the present invention.

FIG. 6 to FIG. 8 concern the third embodiment. FIG. 6 is a block diagram of a display device according to the third embodiment of the present invention.

In FIG. 6, a display unit 10 is the same as that of the first embodiment. A display control device 50 has a weight-calculating unit 51.

The weight-calculating unit 51 applies a mask to an input image signal I0 in accordance with a weighting characteristic, and outputs the masked signals to a characteristic value-calculating unit 21. Examples of the weighting characteristic are shown in FIG. 7 and FIG. 8. The characteristic value-calculating unit 21 calculates a characteristic value based on the masked input image signal.

With regard to this "mask," it is sufficient that the input image signal is masked in any way as a result. For example, I0*Weight(I0) may be used as the masked input image signal.

Besides this, the characteristic value-calculating unit 21 may obtain the characteristic value by dividing the product sum of the weight factor (Weight(I0)) and the input image signal I0 by a cumulative weight value.

To be more specific:

$$\text{Characterisic value} = \text{product sum}/\text{cumulative weight value}$$
$$= \sum \{I0 \times \text{Weight}(I0)\} / \sum \{\text{Weight}(I0)\}$$

Thus, even in this case, in the present specification, it is assumed that the characteristic value-calculating unit 21 calculates the characteristic value based on the masked input image signal. Here, as for calculating the characteristic value, a calculation using an equation may be used or a suitable table may be prepared and referenced.

The weighting characteristic of FIG. 7 is suited for a natural image, for example. In the characteristic, low level signals (0<=I0<Pa) and high level signals (Pb<I0<=255) are suppressed, and consequently, middle level signals (Pa<=I0<=Pb) are given priority.

In FIG. 7, "a" and "b" indicate slopes, Pa and Pb indicate weight control points, and MaxW indicates the maximum weight. Here, although the slopes "a" and "b" and the weight control points Pa and Pb may be fixed values, these values are preferably determined adaptively with respect to the input image by simple conversion equations with an average brightness as an argument.

The weighting characteristic of FIG. 8 is suitable for an image that is dark as a whole (for example, an image taken at night). With this characteristic, middle level signals (Pa<=I0<=Pb) and high level signals (Pb<I0<=255) are suppressed, and consequently, low level signals (0<=I0<Pa) are given priority.

Since the preferable weight characteristic will differ according to the variations of such circumstances as the scene, temperature, illuminance, time, etc., the weight characteristics of FIG. 7 and FIG. 8 and other weight characteristics are preferably prepared and arranged to be switched according to the state of the image.

By thus weighting the input image signal in accordance with the state of the image, unnecessary variations of the characteristic value can be suppressed and the occurrence of flickering can be reduced.

Second Modification Example

Figure 15:
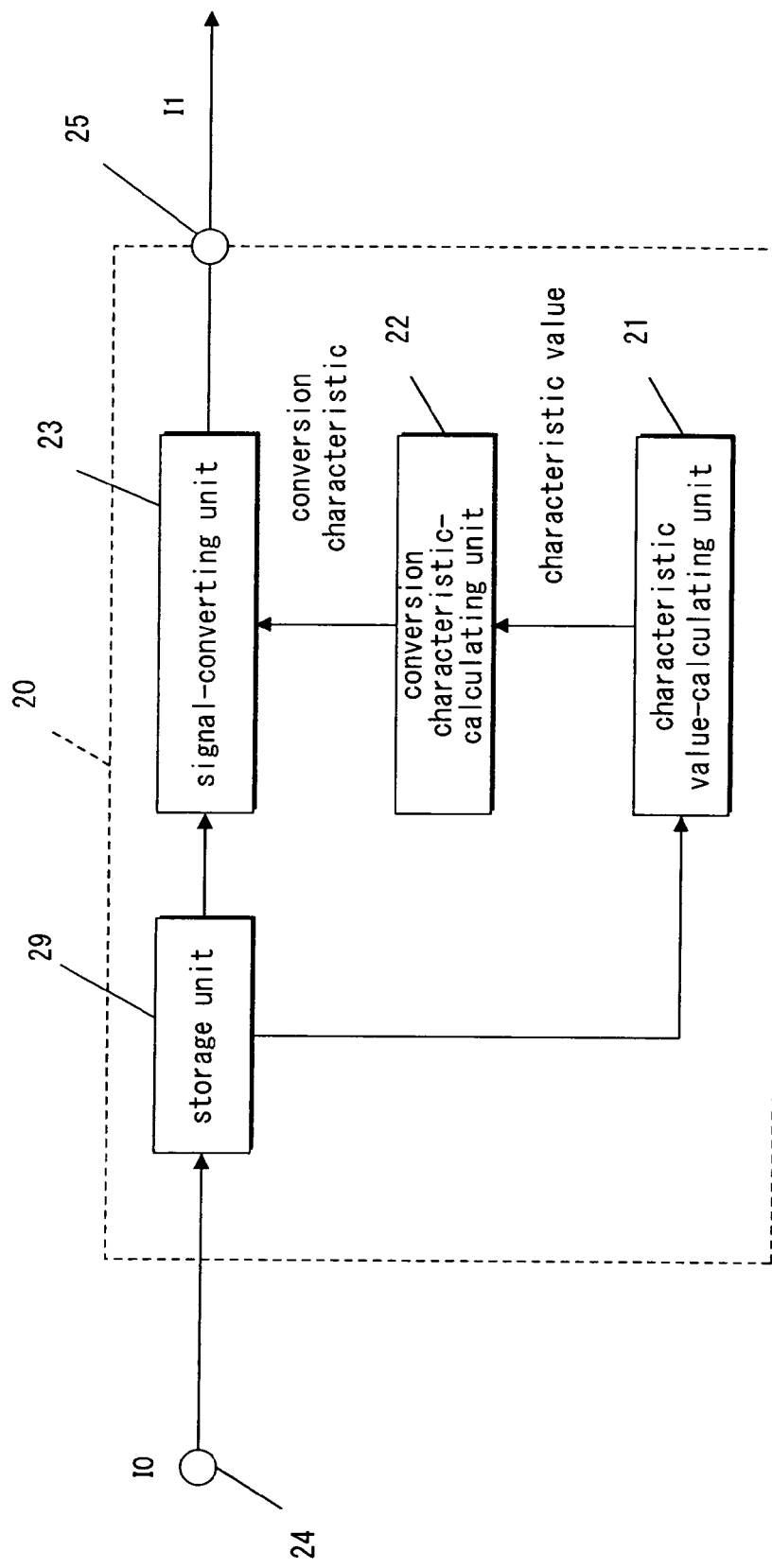
FIG. 15 is a block diagram of a display device according to a Second Modification Example of the present invention.

FIG. 15 concerns a Second Modification Example of the first to third embodiments. For simplification of description, the following description shall be based on the first embodiment.

As shown in FIG. 15, according to the Second Modification Example, a storage unit 29 is provided between an input terminal 24 and a signal-converting unit 23. The storage unit 29 is constructed, for example, by a memory and has a region in which an input image signal I0 for a single frame can be stored.

Providing the storage unit 29 is favorable in that a conversion characteristic, which is determined by a characteristic value-calculating unit 21 and a conversion characteristic-calculating unit 22 based on the input image signal I0 of an N-th frame (N being a natural number), can be applied to the input image signal I0 of the N-th frame itself.

When the circuit scale is restricted, the storage unit 29 may be omitted as shown in FIG. 1, FIG. 4, and FIG. 6.

Third Modification Example

Figure 16:
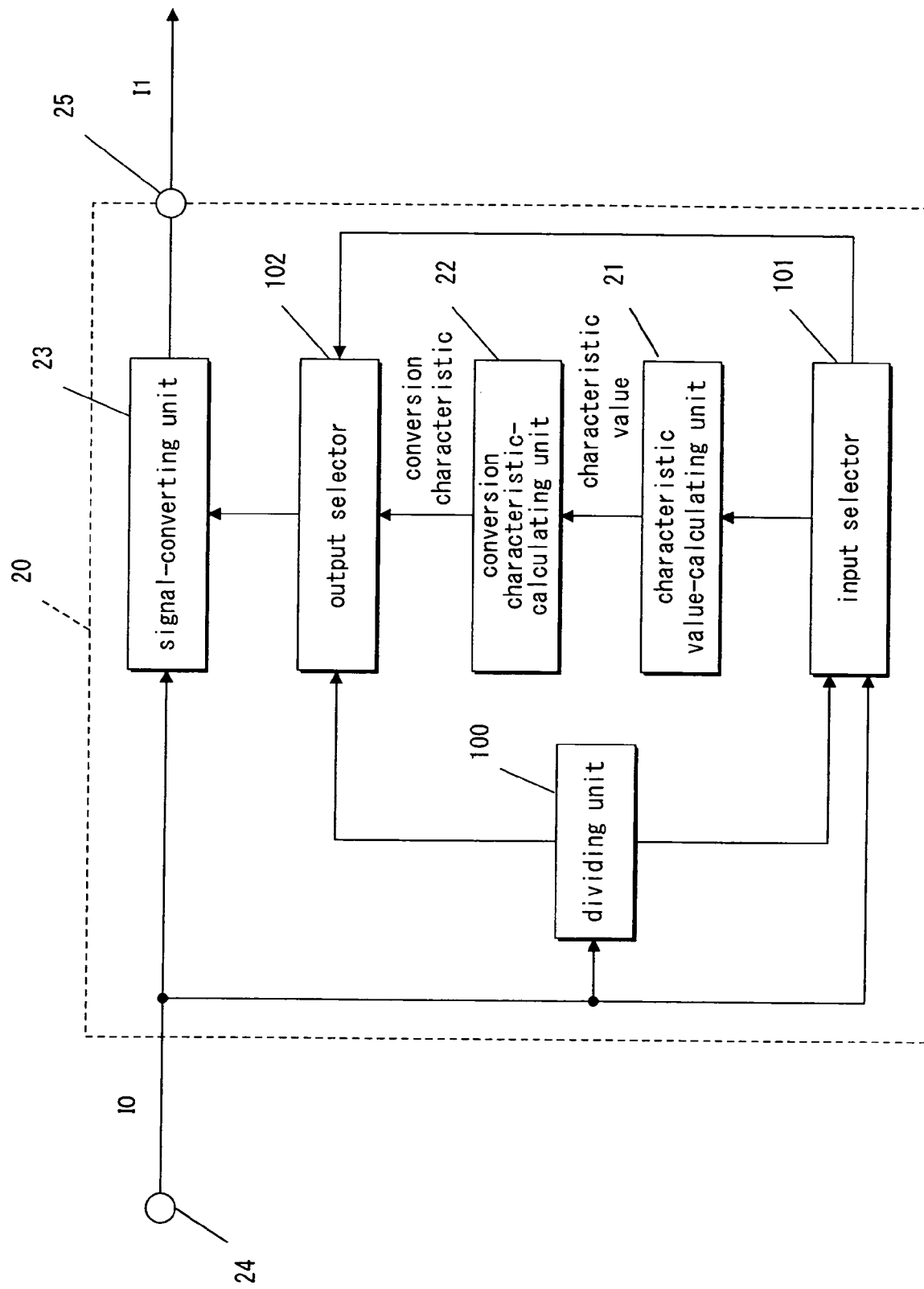
FIG. 16 is a block diagram of a display device according to a Third Modification Example of the present invention.

FIG. 16 concerns a Third Modification Example of the first to third embodiments. As for the Third Modification Example, a description based on the first embodiment shall be provided.

To put it simply, according to the Third Modification Example, a characteristic value-calculating unit 21 calculates a plurality of characteristic values for an input image signal I0 of each single frame, and display control is carried out based on these characteristic values.

In FIG. 16, a dividing unit 100 inputs an input image signal I0 of a single frame expressing a single image. The dividing unit 100 divides the single frame image into plural sub-images, where each of the plural sub-images is confined in an area. The dividing method is arbitrary. For example, if the input image signal I0 is in compliance with a format that enables distinction among objects, the dividing method may produce sub-images that indicate respective objects.

Also, more simply, fixing the number of pixels and positions of a plurality of areas, the dividing unit 100 may divide the single frame image into plural sub-images in accordance with such fixed areas. In this case, the respective areas may be the same in size. Alternatively, it is also preferable to divide the single frame image into sub-images of comparatively small areas near the center of the frame, which tends to be conspicuous, and to divide into sub-images of comparatively large areas near the outer edges of the frame, which tend to be inconspicuous.

Furthermore, when the single frame image is composed of a plurality of pictures, such as child pictures and a parent picture or character pictures and image pictures, dividing the single frame image according to the respective pictures may be performed.

In any case, with the Third Modification Example, the dividing unit 100 outputs plural sub-images obtained from the single frame image, to an input selector 101 and an output selector 102. The input selector 101 selects a sub-image from among the plural sub-images and outputs the selected sub-image to the characteristic value-calculating unit 21. Thereafter, a conversion characteristic-calculating unit 22 calculates a conversion characteristic suited for the selected sub-image in the same manner as described above, and outputs the conversion characteristic to the output selector 102.

The output selector 102 outputs the current sub-image and the conversion characteristic suited for the sub-image to a signal-converting unit 23.

The above processes are executed repeatedly for all sub-images of the single frame image.

As shown in FIG. 16, in the Third Modification Example, just one set of the characteristic value-calculating unit 21 and the conversion characteristic-calculating unit 22 is provided. However, if the number of sub-images for each frame is known, the corresponding number of sets of the characteristic value-calculating unit 21 and the conversion characteristic-calculating unit 22 may be provided in parallel, to consequently increase the processing speed.

By thus performing signal conversion for each sub-image, the display control can be performed more finely and the quality of displayed images can be improved correspondingly.

FOURTH EMBODIMENT

Figures 9, 10:
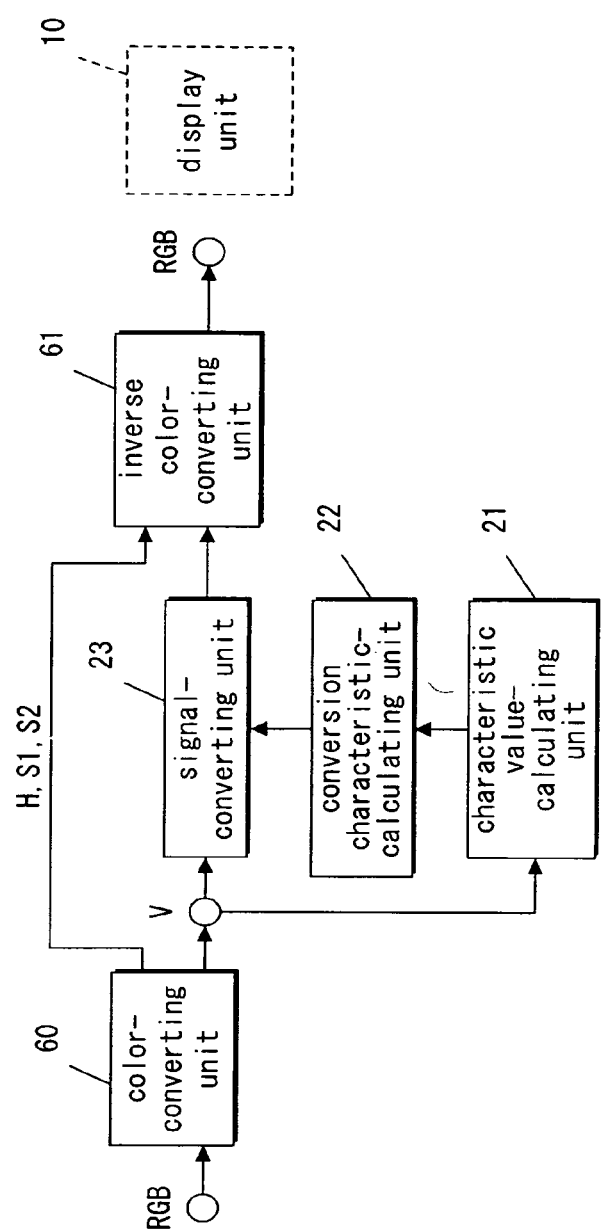
FIG. 9 is a block diagram of a display device according to a fourth embodiment of the present invention.
FIG. 10 is an explanatory diagram of a table used for hue selection in the fourth embodiment of the present invention.

FIG. 9 and FIG. 10 concern a fourth embodiment. FIG. 9 is a block diagram of a display device according to the fourth embodiment of the present invention. According to the present embodiment, color clipping is prevented by converting the brightness component using a conversion characteristic in an HSV color space, which is the same in capacity in regard to the brightness component as the RGB color space. Although an HS1S2V color space, which is a modified HSV color space, is used in the present embodiment, the conventional HSV color space may be used instead.

In FIG. 9, although a characteristic value-calculating unit 21, a conversion characteristic-calculating unit 22, and a signal-converting unit 23 are the same in structure as those of the first embodiment. However, the characteristic value-calculating unit 21 and the signal-converting unit 23 differ from those of the first embodiment in inputting not an input image signal I0 of luminance but a brightness component V that is obtained by a color-converting unit 60 in mapping from the RGB color space to the HSV color space.

The color-converting unit 60 outputs, in addition to the brightness component V, hues H and chromas S by conversion. Specifically, the color-converting unit 60 maps RGB signals into the HS1S2V color space by the following equations:

Brightness component $V = \max(R, G, B)$

First chroma $S1 = (V - \min(R, G, B))/V$

Second chroma $S2 = \{mid(R, G, B) - \min(R, G, B)\} / \{V - \min(R, G, B)\}$

Hue H is a parameter that expresses the magnitude relationships of R, G, and B, and is selected by the color-converting unit 60 as shown in FIG. 10. Using such conversion equations, the brightness component and the chroma components can be determined by simple calculations, and the circuit scale can be made small in realizing the hardware.

In the above equations, max( ), min( ), and mid( ) respectively indicate the maximum value, minimum value, and median of values inside the parenthesis.

Furthermore, in FIG. 9, an inverse color-converting unit 61 uses the outputs (brightness component) of the signal-converting unit 23 and other components to perform mapping from the HS1S2V color space to the RGB color space by the following equations.

Value $MAX = V$

Value $MID = (1 - (1 - S2)) * V$

Value $MIN = (1 - S1) * V$

The inverse color-converting unit 61 substitutes the corresponding value MAX, value MID, and value MIN into the R value, G value, and B value, in accordance with the state of hue H shown in FIG. 10.

Contrast adjustment can thereby be carried out without causing clipping.

The above-described first to fourth embodiments may be combined as suited.

FIFTH EMBODIMENT

Figure 11:
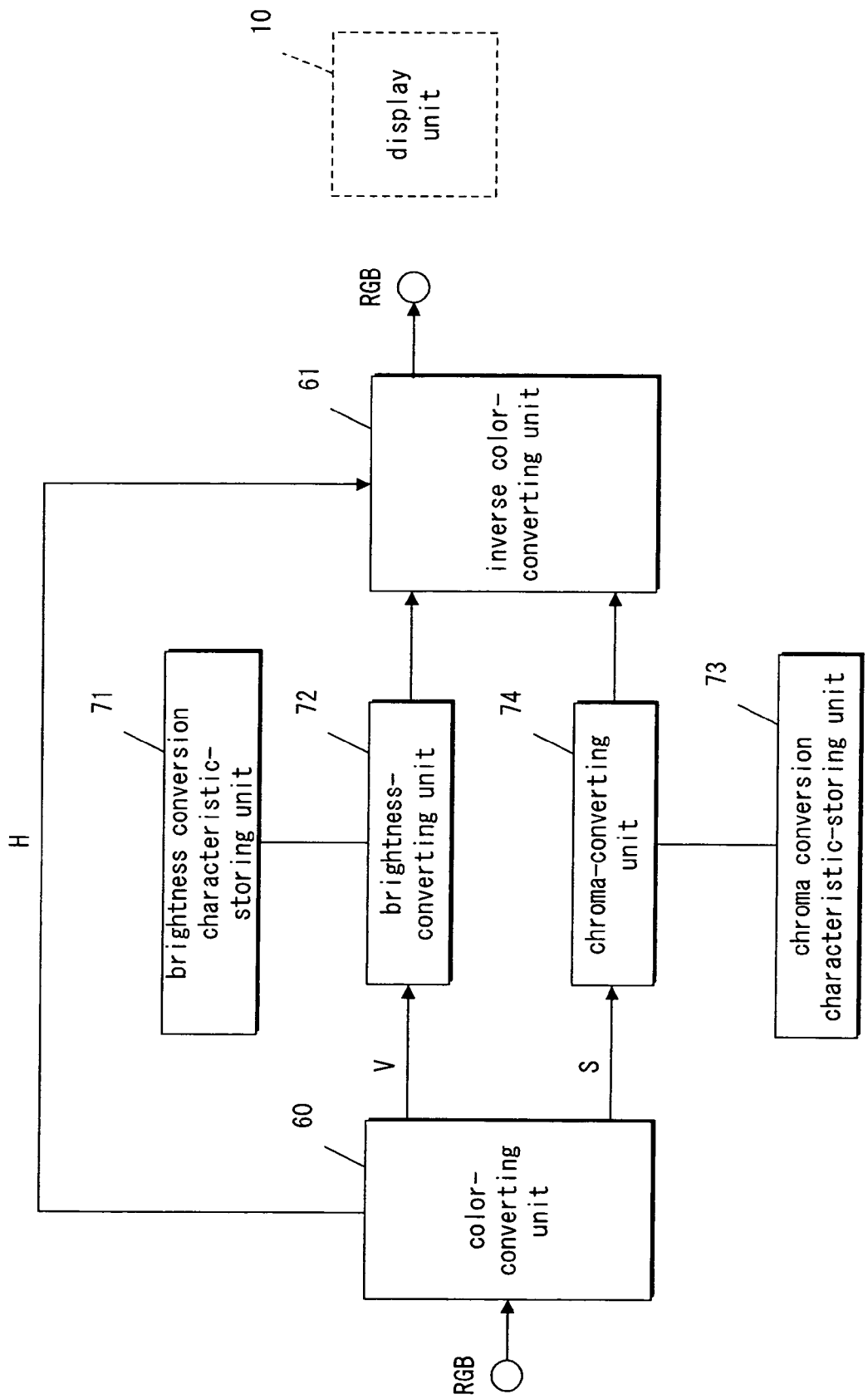
FIG. 11 is a block diagram of a display device according to a fifth embodiment of the present invention.
Figure 12:
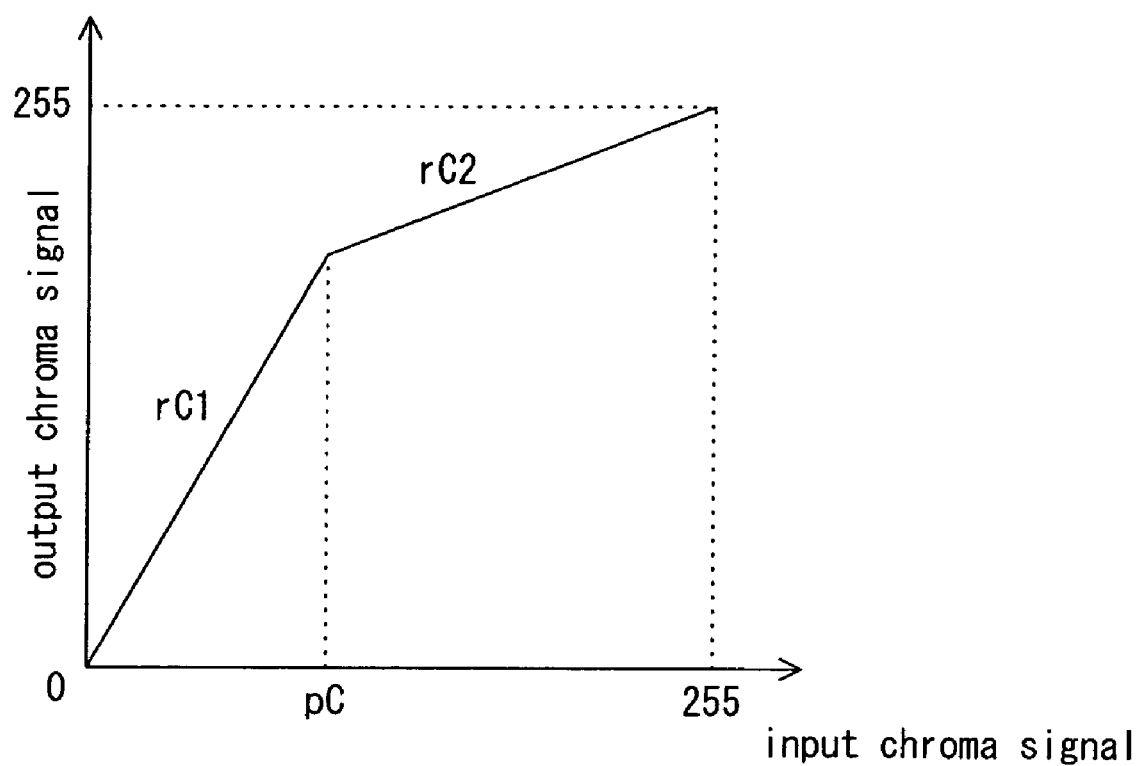
FIG. 12 is an exemplary diagram of a chroma conversion characteristic of the fifth embodiment of the present invention.

FIG. 11 and FIG. 12 concern a fifth embodiment. FIG. 11 is a block diagram of a display device according to the fifth embodiment of the present invention. According to the present embodiment, color clipping is prevented by converting the brightness component using a conversion characteristic in an HSV color space, which is the same in capacity in regard to the brightness component as the RGB color space. Although the HSV color space is used in the present embodiment, an HS1S2V color space, which is a modified HSV color space, may be used instead.

In FIG. 11, a color-converting unit 60 maps an input image signal in the RGB color space to an image signal in the HSV color space, and obtains a brightness component V, chroma components S, and hue components H.

A brightness-converting unit 72 converts the brightness component V in accordance with a fixed brightness conversion characteristic stored in a brightness conversion characteristic-storing unit 71.

A chroma-converting unit 74 converts the chroma components in accordance with a fixed chroma conversion characteristic stored in a chroma conversion characteristic-storing unit 73.

As shown in FIG. 12, according to the present embodiment, the chroma conversion characteristic comprises two segments, each of which is fixed in slope (the slope is rC1 at points less than or equal to an inflection point pC and is rC2 at greater points). These segments form a broken line that is convex in the upward direction.

According to the present embodiment, the slopes are set so that slope rC1>slope rC2 in order to perform contrast enhancement of the middle level. By using a plurality of segments, chroma conversion of a high degree of freedom can be performed. For example, when chroma enhancement is performed in the region 0 to pC1, the vividness of an image having low chroma can be improved.

Also, since a linear processing using segments is performed, the process can be simplified and readily accommodated by the hardware.

In FIG. 11, an inverse color-converting unit 61 maps an image signal in the HSV color space to an image signal in the RGB color space. The image signal in the HSV color space is composed of the brightness component, which has been converted by the brightness-converting unit 72, the chroma components, which have been converted by the chroma-converting unit 74, and the hue components H.

By virtue of the fact that the luminance conversion characteristic-storing unit 71 and the chroma conversion characteristic-storing unit 73 use fixed conversion characteristics that do not depend on the input image signal, the circuit scale can be reduced significantly in realizing the hardware. By processing the chroma components as well as the brightness component, not only the contrast but also the vividness of a displayed image can be enhanced, thereby improving an apparent quality of the displayed image. Also, the brightness component and the chroma components can be processed independently and the quality of the displayed image can thus be adjusted freely.

According to the present embodiment, since processing without clipping is enabled even when the brightness and the chroma are converted independently, image quality designing without inducing degradation of the image quality can be performed freely. Furthermore, by converting the brightness and the chroma at the same time, not only the contrast but also the vividness of a displayed image can be enhanced, thereby improving an apparent quality of the displayed image.

By the present invention, an image display control device, which can be practiced readily in hardware and can suppress flickering and color clipping in displayed images, can be provided.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A display control device for outputting an output image signal, said display control device comprising:
    a characteristic value-calculating unit for calculating a characteristic value based on an input image signal; and
    a conversion characteristic-calculating unit for determining at least one conversion characteristic adaptively with respect to the input image signal based on the characteristic value,
wherein said conversion characteristic-calculating unit is further for determining the at least one conversion characteristic such that, when an abscissa axis represents the input image signal and an ordinate axis represents the output image signal, and a range from an origin of the axes to a full scale point along the abscissa axis is divided into a low level region, which is close to the origin, a high level region, which is close to the full scale point, and a middle level region, which is positioned between the low level region and the high level region, an average slope of the output image signal in the middle level region is greater than any one of average slopes of the output image signal in the low and high level regions.

2. The display control device as defined in claim 1, wherein said characteristic value-calculating unit is further for calculating a plurality of characteristic values based on the input image signal.

3. The display control device as defined in claim 1, further comprising a signal-converting unit for converting the input image signal in accordance with the at least one conversion characteristic determined by said conversion characteristic-calculating unit.

4. The display control device as defined in claim 1, further comprising:
    a signal-converting unit for converting the input image signal in accordance with the at least one conversion characteristic determined by said conversion characteristic-calculating unit; and
    a weight-calculating unit for applying a mask to the input image signal in accordance with a weighting characteristic to generate a masked image signal, wherein:
        said characteristic value-calculating unit is further for calculating the characteristic value based on the masked image signal generated by said weight-calculating unit; and
        said conversion characteristic-calculating unit is further for determining the at least one conversion characteristic based on the characteristic value.

5. The display control device as defined in claim 4, wherein the weighting characteristic suppresses a low level region in the input image signal and a high level region in the input image signal.

6. The display control device as defined in claim 4, wherein the weighting characteristic suppresses a middle level region in the input image signal and a high level region in the input image signal.

7. The display control device as defined in claim 4, wherein the weighting characteristic is determined adaptively with respect to the input image signal.

8. The display control device as defined in claim 1, wherein the characteristic value determines a size and location of the middle level region.

9. The display control device as defined in claim 1, wherein the characteristic value is an average brightness of an image being expressed by the input image signal.

10. The display control device as defined in claim 1, further comprising a signal-converting unit for converting the input image signal in accordance with the at least one conversion characteristic determined by said conversion characteristic-calculating unit,
   wherein said characteristic value-calculating unit is further for outputting a signal that adjusts an output level of said signal-converting unit and a light emission level of an external light source in a correlated manner.

11. The display control device as defined in claim 10, wherein when a maximum ordinate value of the at least one conversion characteristic falls below a threshold value, said characteristic value-calculating unit is further for performing an adjustment so as to raise the output level of said signal-converting unit and to lower the light emission level of the external light source.

12. The display control device as defined in claim 10, wherein when a maximum ordinate value of the at least one conversion characteristic exceeds a threshold value, said characteristic value-calculating unit is further for performing an adjustment so as to raise the light emission level of the external light source.

13. The display control device as defined in claim 1, further comprising:
   a signal-converting unit for converting the input image signal in accordance with the at least one conversion characteristic determined by said conversion characteristic-calculating unit; and
   a light source-adjusting unit for adjusting an output image signal to be fed to a display panel and a light emission control signal to be fed to an external light source in a correlated manner based on an output image signal of said signal-converting unit.

14. A display device comprising:
   a display unit; and
   a display control device for outputting an output image signal, and controlling said display unit by using the output image signal, said display control device comprising:
   a characteristic value-calculating unit for calculating a characteristic value based on an input image signal; and
   a conversion characteristic-calculating unit for determining at least one conversion characteristic adaptively with respect to the input image signal based on the characteristic value,
   wherein said conversion characteristic-calculating unit is further for determining the at least one conversion characteristic such that, when an abscissa axis represents the input image signal and an ordinate axis represents the output image signal, and a range from an origin of the axes to a full scale point along the abscissa axis is divided into a low level region, which is close to the origin, a high level region, which is close to the full scale point, and a middle level region, which is positioned between the low level region and the high level region, an average slope of the output image signal in the middle level region is greater than any one of average slopes of the output image signal in the low and high level regions; and
   wherein said characteristic value-calculating unit is further for calculating a plurality of characteristic values based on the input image signal.

15. A display device as defined in claim 14,
   wherein said display control device further comprises a signal-converting unit for converting the input image signal in accordance with the at least one conversion characteristic determined by said conversion characteristic-calculating unit; and
   wherein said display unit further comprises:
   a display panel for displaying an image, by inputting an output image signal from said signal-converting unit, the output image signal having been adjusted in output levels in accordance with the at least one conversion characteristic determined by said conversion characteristic-calculating unit of said display control device; and
   a light source for illuminating said display panel with an emission level controlled in accordance with the at least one conversion characteristic determined by said conversion characteristic-calculating unit of said display control device.

* * * * *